United States Patent
Lai et al.

(10) Patent No.: US 10,306,722 B2
(45) Date of Patent: May 28, 2019

(54) LED DRIVING CIRCUIT

(71) Applicant: Silergy Semiconductor Technology (Hangzhou) LTD, Hangzhou, ZheJiang Province (CN)

(72) Inventors: Hongbin Lai, Hangzhou (CN); Jianxin Wang, Hangzhou (CN)

(73) Assignee: Silergy Semiconductor Technology (Hangzhou) LTD, Hangzhou (CN)

( * ) Notice: Subject to any disclaimer, the term of this patent is extended or adjusted under 35 U.S.C. 154(b) by 0 days.

(21) Appl. No.: 15/967,721

(22) Filed: May 1, 2018

(65) Prior Publication Data

US 2018/0324916 A1 Nov. 8, 2018

(30) Foreign Application Priority Data

May 3, 2017 (CN) .......................... 2017 1 0302777

(51) Int. Cl.
*H05B 37/02* (2006.01)
*H05B 33/08* (2006.01)

(52) U.S. Cl.
CPC ..... *H05B 33/0845* (2013.01); *H05B 33/0857* (2013.01); *H05B 33/0812* (2013.01); *H05B 33/0815* (2013.01)

(58) Field of Classification Search
CPC ............ H05B 33/0815; H05B 33/0827; H05B 33/0839; H05B 33/0845; H05B 33/0851
USPC ......................................... 315/186, 192, 193
See application file for complete search history.

(56) References Cited

U.S. PATENT DOCUMENTS

| | | | |
|---|---|---|---|
| 7,898,187 B1 | 3/2011 | Mei et al. | |
| 8,614,551 B2 | 12/2013 | Chen et al. | |
| 9,024,542 B2 | 5/2015 | Chen | |
| 9,055,635 B2 | 6/2015 | Yu et al. | |
| 9,192,007 B2 | 11/2015 | Zhang | |
| 9,325,254 B2 | 4/2016 | Deng et al. | |
| 9,357,602 B1* | 5/2016 | Chen .................. | H05B 33/0815 |
| 9,544,969 B2 | 1/2017 | Baddela et al. | |
| 9,872,355 B2 | 1/2018 | Wang et al. | |
| 2009/0322234 A1* | 12/2009 | Chen .................. | H05B 33/0815 315/159 |
| 2012/0200229 A1* | 8/2012 | Kunst ................ | H05B 33/0815 315/186 |
| 2013/0057163 A1* | 3/2013 | Sutardja ............. | H05B 33/0857 315/185 R |
| 2014/0265916 A1* | 9/2014 | Melanson .......... | H05B 33/0809 315/291 |
| 2016/0044759 A1 | 2/2016 | Lai et al. | |
| 2016/0066378 A1 | 3/2016 | Wang et al. | |
| 2017/0171930 A1* | 6/2017 | Jin ....................... | H05B 33/086 |

* cited by examiner

*Primary Examiner* — Tung X Le
(74) *Attorney, Agent, or Firm* — Michael C. Stephens, Jr.

(57) ABSTRACT

An LED driving circuit configured to drive an LED lamp having first and second loads, can include: a power converter; a dimmer configured to control the power converter to output a driving current to the LED lamp; and a current distribution circuit configured to adjust a proportion of current from the driving current that flows through each of the first and second loads of the LED lamp, in order to adjust the color temperature or the brightness of the LED lamp.

14 Claims, 4 Drawing Sheets

US 10,306,722 B2

LED DRIVING CIRCUIT

RELATED APPLICATIONS

This application claims the benefit of Chinese Patent Application No. 201710302777.7, filed on May 3, 2017, which is incorporated herein by reference in their entirety.

FIELD OF THE INVENTION

The present invention generally relates to the field of power electronics, and more particularly, to light-emitting diode (LED) driving circuitry.

BACKGROUND

With increasingly use of LED lights, multi-stage switching converters can typically be used in order to adjust the brightness of the light sources. In addition, each stage may deal with the power in total, which can increase product costs of the LED drivers. In order to reduce such costs, some techniques divide the secondary winding at the output side of a flyback converter into two groups, and a DC-DC converter of the second stage may be connected to only one of the two groups. In one LED luminance system, in order to achieve current balance of each LED branch circuit, a linear regulator (LDO) may be coupled with the LED branch circuit in order to regulate the LED driving current.

DETAILED DESCRIPTION

Reference may now be made in detail to particular embodiments of the invention, examples of which are illustrated in the accompanying drawings. While the invention may be described in conjunction with the preferred embodiments, it may be understood that they are not intended to limit the invention to these embodiments. On the contrary, the invention is intended to cover alternatives, modifications and equivalents that may be included within the spirit and scope of the invention as defined by the appended claims. Furthermore, in the following detailed description of the present invention, numerous specific details are set forth in order to provide a thorough understanding of the present invention. However, it may be readily apparent to one skilled in the art that the present invention may be practiced without these specific details. In other instances, well-known methods, procedures, processes, components, structures, and circuits have not been described in detail so as not to unnecessarily obscure aspects of the present invention.

As a relatively new lighting tool, light-emitting diode (LED) lighting has become increasingly used in various lighting fields due to advantages of high lighting efficiency, long lifetime, environmental protection, and so on. LED dimming methods can generally be divided into two categories: DC dimming and pulse-width modulation (PWM) dimming. PWM dimming has widely been utilized due to its advantages of constant light color and good stability at low brightness. For some special light source environments, not only may the brightness of the LED lamp need to be adjusted, but the color temperature of the LED lamp may need to be adjusted.

Figure 1:
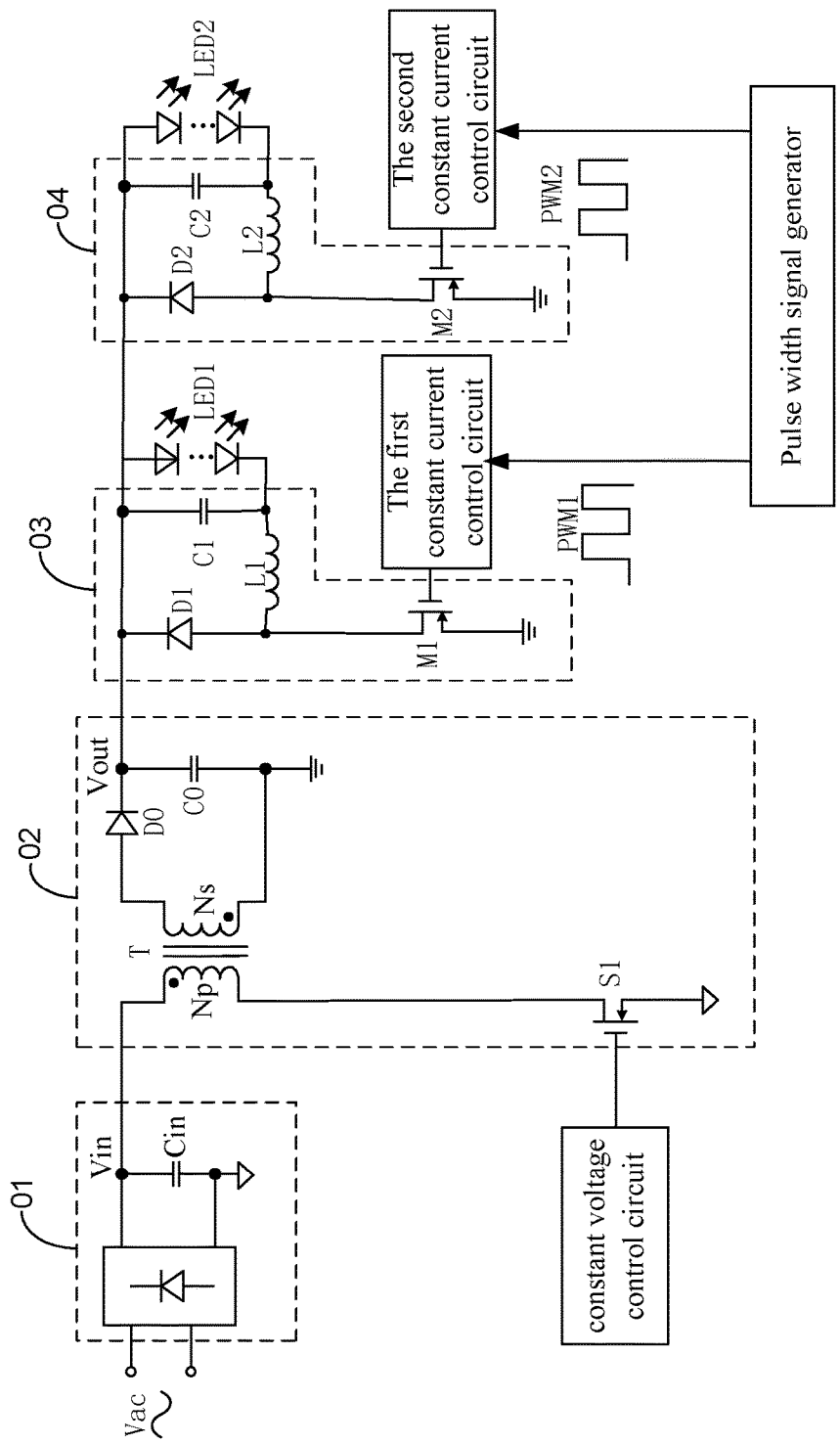
FIG. 1 is a schematic block diagram of an example LED driving circuit.

Referring now to FIG. 1, shown is a schematic block diagram of an example LED driving circuit. In this example, AC voltage Vac may be converted to voltage Vin through a rectifier and filter circuit 01. Power converter 02 can receive voltage Vin, and may output constant voltage Vout under the control of a constant voltage control circuit. Constant voltage Vout can be used as an input voltage of constant current driving circuits 03 and 04. The first current control circuit can control constant current driving circuit 03 to output a constant driving current to a cool-color temperature LED light string LED1, and the second constant current control circuit can control constant current driving circuit 04 to output a constant driving current to a warm-color temperature LED light string LED2. Constant current driving circuits 03 and 04 can respectively receive pulse-width modulation signals PWM1 and PWM2 generated from a pulse-width modulation signal generator, in order to control the average current of light strings LED1 and LED2, thereby achieving dimming and color adjustment of the LED lamp.

In this approach, the LED driving circuit may need an independent constant current driving circuit in order to drive the LED light strings with corresponding color light, and each constant current driving circuit may need to be equipped with a constant current control circuit. In addition, since a constant current driving circuit is typically constructed by a plurality of devices, such as including an energy storage device, more electronic components and increased circuit complexity can result. Thus, realizing such an LED driving circuit with dimming and color adjusting functions may have relatively high production costs, and system size, which makes integration more difficult.

In one embodiment, an LED driving circuit configured to drive an LED lamp having first and second loads, can include: (i) a power converter; (ii) a dimmer configured to control the power converter to output a driving current to the LED lamp; and (iii) a current distribution circuit configured to adjust a proportion of current from the driving current that flows through each of the first and second loads of the LED lamp, in order to adjust the color temperature or the brightness of the LED lamp.

Figure 2:
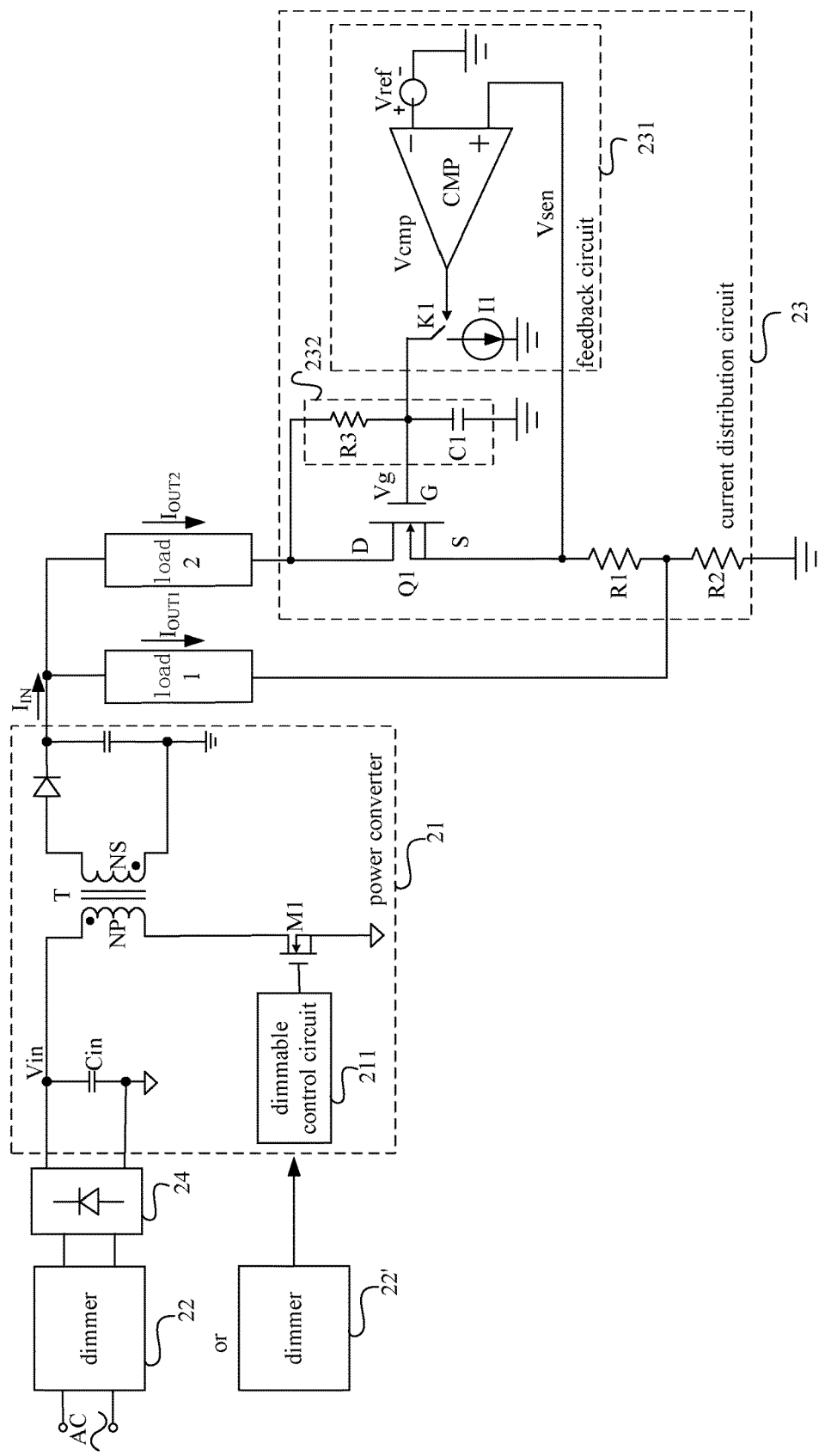
FIG. 2 is a schematic block diagram of an example LED driving circuit, in accordance with embodiments of the present invention.

Referring now to FIG. 2, shown is a schematic block diagram of an example LED driving circuit, in accordance with embodiments of the present invention. This particular example LED driving circuit can be used to drive an LED lamp having two loads, and can include power converter 21, dimmer 22, and current distribution circuit 23. Power converter 21 can output predetermined driving current $I_{IN}$ to the LED lamp according to a dimming instruction. This example LED driving circuit may also include rectifier circuit 24. Power converter 21 can include power switch M1 with its switch states being controlled by dimmable control circuit 211, such that power converter 21 may output a desired driving current $I_{IN}$. Rectifier circuit 24 can receive an AC voltage AC, and output a DC voltage Vin to power converter 21. Power converter 21 can convert DC voltage Vin into the driving current, and may output the driving current.

Power converter 21 may be implemented with an isolated topology or a non-isolated topology. In this particular example, power converter 21 can be implemented with a flyback power converter. Power converter 21 can also include transformer T with primary winding Np and secondary winding Ns. Primary winding Np can connect to power switch M1. Dimmable control circuit 211 can control the on state and off state of power switch M1, such that power converter 21 outputs predetermined driving current $I_{IN}$. Any suitable approach of making power converter 21 output the predetermined driving current by controlling the switching states of power switch M1 through dimmable control circuit 211 can be employed in certain embodiments. For example, by detecting the phase angle of silicon-controlled dimmer 22, an output current (e.g., driving current $I_{IN}$ of power converter 21) can be regulated by adjusting a current reference in dimmable control circuit 211 according to the detected phase angle. The output current of power converter 21 can also be regulated by dimmable control circuit 211 directly according to the dimming instruction of dimmer 22'.

The LED lamp can include two loads (e.g., load 1 and load 2) coupled in parallel. The two loads can include two LED light strings with different color temperatures, or one LED light string and one other types of load (e.g., a resistor). The sum of current $I_{OUT1}$ flowing through load 1 and current $I_{OUT2}$ flowing through load 2 can be referred to as driving current $I_{IN}$. In this particular example, load 1 can be a cool-color temperature LED light string, and load 2 can be a warm-color temperature LED light string. Current distribution circuit 23 can adjust the current flowing through each of the loads in the LED lamp according to driving current $I_{IN}$. In this case, the proportions of current $I_{OUT1}$ flowing through load 1, and current $I_{OUT2}$ flowing through load 2 in driving current $I_{IN}$ may be respectively adjusted, thereby adjusting the color temperature or brightness of the LED lamp.

Current distribution circuit 23 can connect in series with one of the two loads. Current distribution circuit 23 can include transistor Q1, resistor R1, resistor R2, and feedback circuit 231. For example, load 2, transistor Q1, and resistors R1 and R2 may be sequentially connected in series. That is, one terminal of transistor Q1 can connect to one terminal of load 2, and a first terminal of resistor R1 can connect to the other terminal of transistor Q1. A second terminal of resistor R1 can connect to a first terminal of resistor R2, and a second terminal of resistor R2 may be grounded. For example, the other of the two loads can connect to the common node of resistors R1 and R2.

Feedback circuit 231 can receive feedback voltage Vsen at the common node of resistor R1 and transistor Q1, and reference voltage Vref. Feedback circuit 231 may generate control signal Vg of transistor Q1 by comparing feedback voltage Vsen against reference voltage Vref. Feedback circuit 231 can include comparator CMP, switch K1, and current source I1. For example, the inverting input terminal of comparator CMP can receive reference voltage Vref, the non-inverting input terminal can receive feedback voltage Vsen, and the output terminal may provide comparison signal Vcmp. Switch K1 can be controlled by comparison signal Vcmp, and a first terminal of switch K1 can connect to gate G of transistor Q1. A second terminal of switch K1 can connect to a first terminal of current source I1, and a second terminal of current source I1 may be grounded. The first terminal of switch K1 may output control signal Vg of transistor Q1.

In normal operation, the sum of current $I_{OUT1}$ flowing through load 1, and current $I_{OUT2}$ flowing through load 2 may be driving current $I_{IN}$. That is, $I_{OUT1}+I_{OUT2}=I_{IN}$ (Formula 1). Current $I_{OUT1}$ flowing through load 1, and current $I_{OUT2}$ flowing through load 2 may form a voltage drop across resistors R1 and R2. Due to the presence of feedback circuit 231, the voltage at the first terminal of resistor R1 (e.g., feedback voltage Vsen) can be maintained at reference voltage Vref. Thus, there is $(R1+R2)*I_{OUT2}+R2*I_{OUT1}=Vref$ (Formula 2). Therefore, according to Formulas 1 and 2, the proportions of current $I_{OUT1}$ flowing through load 1, and current $I_{OUT2}$ flowing through load 2 in driving current $I_{IN}$ can be respectively obtained for different driving currents $I_{IN}$.

Figure 3:
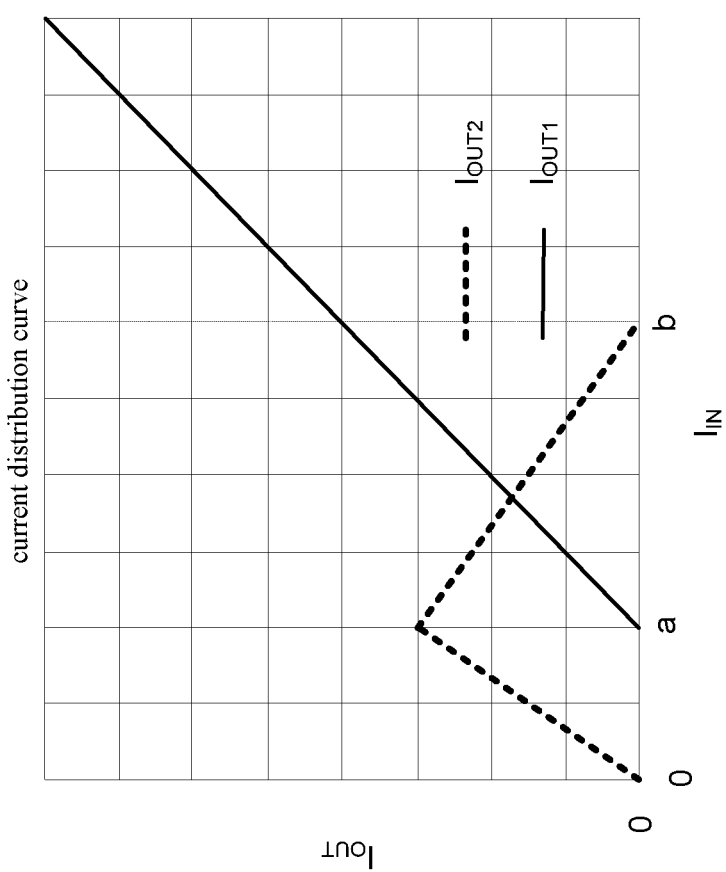
FIG. 3 is an example current distribution curve of an example LED driving circuit, in accordance with embodiments of the present invention.

Referring now to FIG. 3, shown is an example current distribution curve of an example LED driving circuit, in accordance with embodiments of the present invention. In this example, it can be seen that the proportions of current $I_{OUT1}$ flowing through load 1, and current $I_{OUT2}$ flowing through load 2 in driving current $I_{IN}$ may change for different driving currents $I_{IN}$. The current distribution curve may have two turning points: turning point "a" and turning point "b" in the example of FIG. 3. In this example, driving circuit $I_{IN}$ at turning point "a" is threshold Ia, and driving circuit $I_{IN}$ at turning point "b" is threshold Ib. As shown, when driving current $I_{IN}$ is less than threshold Ia, only load 2 operates. When driving current $I_{IN}$ is greater than threshold Ia and less than threshold Ib, both load 1 and load 2 operate. When drive current $I_{IN}$ is greater than threshold Ib, only load 1 operates.

In this particular example, load 1 is a cold color temperature LED light string, and load 2 is a warm color temperature LED light string. Due to the above current distribution characteristics, when driving current $I_{IN}$ is relatively small, only load 2 (e.g., the warm-color temperature LED light string) operates, and the light of the LED light string can be warm white. When driving current $I_{IN}$ increases to be greater than threshold Ia and less than threshold Ib, current $I_{OUT2}$ of load 2 (e.g., the warm-color temperature LED light string) may gradually decrease, current $I_{OUT1}$ of load 1 (e.g., the cool-color temperature LED light string) may gradually increase, and the light of the LED light string can gradually change from warm white to cool white. When driving current $I_{IN}$ is greater than threshold Ib, only load 1 (e.g., the cold-color temperature LED light string) operates, and the light of the LED light string can be cool white. Thus, according to different driving currents $I_{IN}$, it is possible to assign different currents to the two loads in order to adjust the color temperature of the LED lamp, which may be particularly suitable for sunset lamps.

In particular embodiments, if load 1 or load 2 is set as an LED light string, and the other load is set as a resistor, the LED driving circuit can still operate and the brightness of the LED lamp may be adjusted. As discussed above, when driving current $I_{IN}$ is different, the proportions of current $I_{OUT1}$ flowing through load 1, and current $I_{OUT2}$ flowing through load 2 in driving current $I_{IN}$ can change accordingly, such as per the current distribution curve shown in FIG. 3. If load 1 is the LED light string, and load 2 is the resistor, according to the relationship of current $I_{OUT1}$ flowing through load 1 varying with driving current $I_{IN}$, it is known that after turning point "a," the greater driving current $I_{IN}$ is, the greater current $I_{OUT1}$ flowing through load 1 is, and the brightness of the LED lamp is also brighter. If load 2 is the LED light string and load 1 is the resistor, according to the relationship of current $I_{OUT2}$ flowing through load 2 varying with the driving current $I_{IN}$, it is known that before turning point "a," the greater driving current $I_{IN}$ is, the greater current $I_{OUT2}$ flowing through load 2 is, and the brightness of the LED lamp is also brighter. After the turning point "a" and before turning point "b," the greater driving current $I_{IN}$ is, the smaller the current $I_{OUT2}$ flowing through load 2 is, and the brightness of the LED lamp may also be reduced.

It should be noted that turning point "a" and turning point "b" are not fixed. In the circuit, threshold Ia of driving current $I_{IN}$ at turning point "a" is Ia=Vref/(R1+R2), and threshold Ib of circuit current $I_{IN}$ at turning point "b" is Ib=Vref/R2. Therefore, by adjusting the resistance of resistor R1 and/or resistor R2, the positions of turning point "a" and turning point "b" can be changed. That is, for the same driving current $I_{IN}$, the proportion of the current flowing through each load of the LED lamp in the driving current can be changed. Based on this, the turning points of the LED lamp's color temperature or brightness can be flexibly changed according to different requirements in any given application.

Referring back to FIG. 2, current distribution circuit 23 can also include ripple removing circuit 232, which can include capacitor C1 and resistor R3. For example, resistor R3 can connect in parallel between drain D and gate G of transistor Q1, and capacitor C1 can connect in parallel between gate G of transistor Q1 and ground. When driving current $I_{IN}$ is less than threshold Ia, only load 2 may operate, and the voltage across load 2 can be less than the voltage across load 1. When the values of capacitor C1 and resistor R3 are relatively large, the LED driving circuit can also have the function of eliminating output jitter (e.g., caused by the city electric jitter, or the strobe caused by the dimmer).

Figure 4:
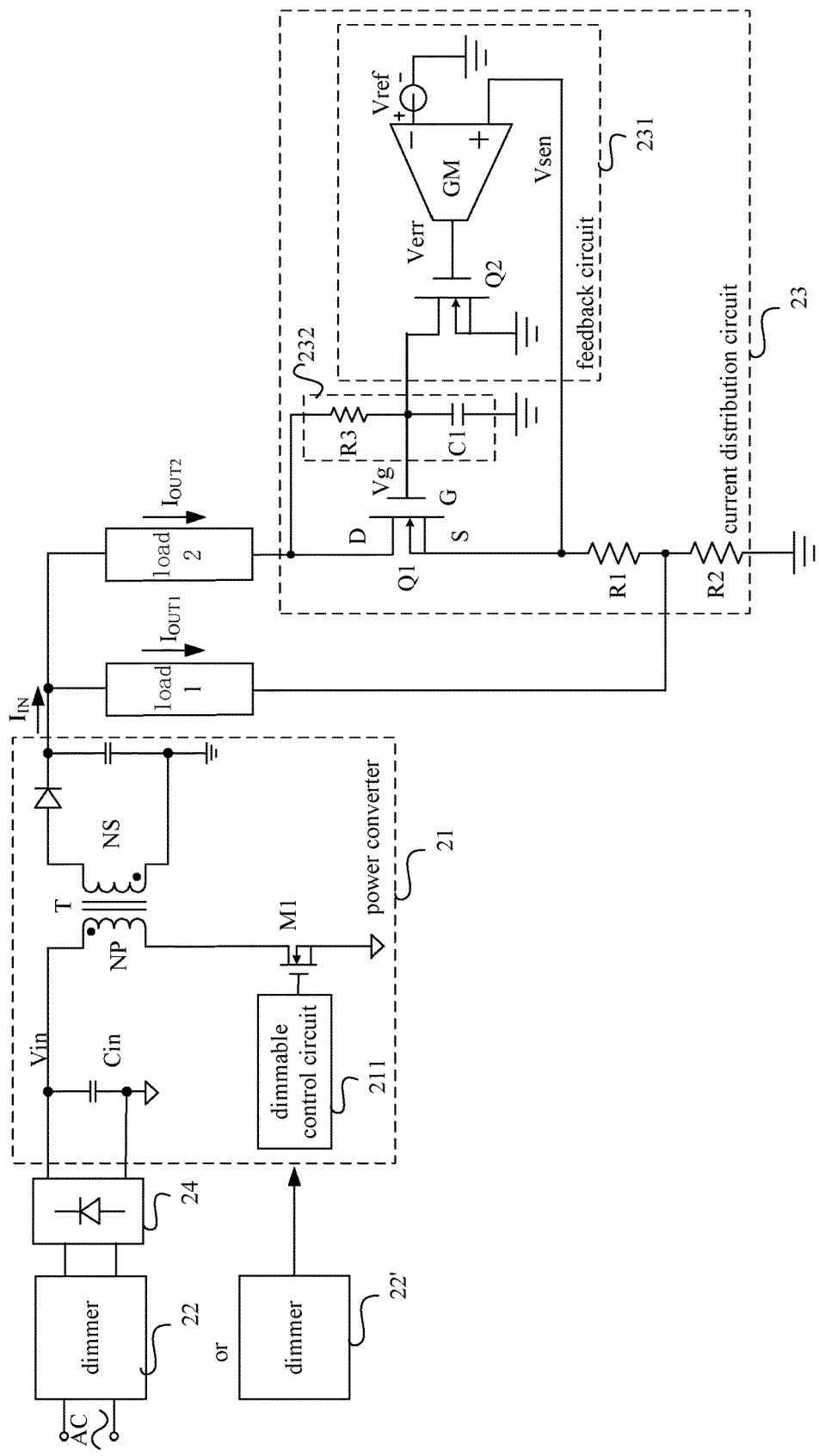
FIG. 4 is a schematic block diagram of another example LED driving circuit, in accordance with embodiments of the present invention.

Referring now to FIG. 4, shown is a schematic block diagram of another example LED driving circuit, in accordance with embodiments of the present invention. The difference between the LED driving circuits shown in FIGS. 2 and 4 lies in the different implementations of feedback circuit 231. In this particular example, feedback circuit 231 can include transconductance amplifier GM and transistor Q2. For example, the inverting input terminal of transconductance amplifier GM can receive reference voltage Vref, the non-inverting input terminal can receive feedback voltage Vsen, and the output terminal may output error amplified signal Verr. Transistor Q2 can be controlled by error amplified signal Verr, and the first power terminal of transistor Q2 can connect to gate G of transistor Q1. The second power terminal of transistor Q2 can connect to ground. The first power terminal of transistor Q2 can output signal Vg of transistor Q1.

In particular embodiments, an LED driving circuit may provide a predetermined driving current to the LED lamp through a power converter, and then adjusts the proportion of each load current of the LED lamp in the driving current through the current distribution circuit according to the driving current, in order to adjust the color temperature or brightness of the LED lamp. In addition, the LED driving circuit may eliminate output jitter, such as may be caused by the city electric jitter or the strobe caused by the dimmer when the driving current is small. Therefore, the LED driving circuit of particular embodiments can adjust the color temperature and the brightness of the LED lamp without needing to equip an independent constant current driving circuit and a constant current control circuit to each load. The circuit structure is thus relatively simple and easily integrated, uses fewer peripheral devices, and results in a relatively small circuit volume with relatively low production costs.

The embodiments were chosen and described in order to best explain the principles of the invention and its practical applications, to thereby enable others skilled in the art to best utilize the invention and various embodiments with modifications as are suited to particular use(s) contemplated.

It is intended that the scope of the invention be defined by the claims appended hereto and their equivalents.

What is claimed is:

1. A light-emitting diode (LED) driving circuit configured to drive an LED lamp having first and second loads, the LED driving circuit comprising:
    a) a dimmer configured to control a power converter to output a driving current to said LED lamp;
    b) a current distribution circuit connected in series with said second load, and being configured to adjust a proportion of current from said driving current that flows through each of said first and second loads of said LED lamp in accordance with said driving current, in order to adjust the color temperature or the brightness of said LED lamp:,
    c) wherein when said driving current is less than a first threshold, only said second load operates;
    d) wherein when said driving current is greater than said first threshold and less than a second threshold, both of said first and second loads operate; and
    e) wherein when said driving current is greater than said second threshold, only said first load operates.

2. The LED driving circuit of claim 1, wherein said current distribution circuit comprises:
    a) a first resistor having a first terminal connected to a first transistor, and a second terminal connected to a first terminal of a second resistor, wherein a second terminal of said second resistor is grounded; and
    b) a feedback circuit configured to receive a feedback voltage at a common node of said first resistor and said first transistor, and a reference voltage, and to generate a control signal for said first transistor, wherein said first load is connected to a common node of said first and second resistors.

3. The LED driving circuit of claim 2, wherein said proportion of current from said driving current that flows through each of said first and second loads is regulated by adjusting a resistance of at least one of said first and second resistors.

4. The LED driving circuit of claim 2, wherein said feedback circuit comprises:
    a) a comparator configured to receive said reference voltage at an inverting input terminal, to receive said feedback voltage at a non-inverting input terminal, and to generate a comparison signal; and
    b) a first switch controlled by said comparison signal, said first switch having a first terminal coupled to a gate of said first transistor, and a second terminal coupled to a first terminal of a current source, wherein a second terminal of said current source is grounded, and said first terminal of said first switch outputs a control signal for said first transistor.

5. The LED driving circuit of claim 2, wherein said feedback circuit comprises:
    a) a transconductance amplifier configured to receive said reference voltage at an inverting input terminal, to receive said feedback voltage at a non-inverting input terminal, and to generate an error amplified signal; and
    b) a second transistor controlled by said error amplified signal, said second transistor having a first power terminal coupled to a gate of said first transistor, and a second power terminal connected to the ground, wherein said first power terminal of said second transistor outputs a control signal for said first transistor.

6. The LED driving circuit of claim 2, wherein said current distribution circuit further comprises a ripple removing circuit having:

a) a first capacitor coupled in parallel between a drain and a gate of said first transistor; and b) a third resistor coupled in parallel between said gate of said first transistor and ground.

7. The LED driving circuit of claim 1, wherein said current distribution circuit comprises first and second resistors coupled in series with said second load, and said first and second thresholds are determined by the resistances of said first and second resistors.

8. The LED driving circuit of claim 7, wherein said first load is coupled to a common node between said first and second resistors.

9. The LED driving circuit of claim 7, wherein said first threshold is configured as a ratio of a reference voltage to a sum of resistances of said first and second resistors, and said second threshold is configured as a ratio of said reference voltage to a resistance of said second resistor.

10. The LED driving circuit of claim 9, wherein said current distribution circuit comprises:

a) a first transistor coupled in series with said second load and said first and second resistors; and b) a feedback circuit configured to receive said reference voltage and a feedback voltage at a common node of said first resistor and said first transistor, and to generate a control signal for said first transistor.

11. The LED driving circuit of claim 1, wherein said first load is configured as a resistor, and said second load is configured as an LED load.

12. The LED driving circuit of claim 1, wherein a current flowing through said second load is linearly increased when said driving current is less than said first threshold.

13. The LED driving circuit of claim 12, wherein said current flowing through said second load is linearly decreased when said driving current is between said first threshold and said second threshold.

14. The LED driving circuit of claim 12, wherein a current flowing through said first load is linearly increased when said driving current is greater than said first threshold.

* * * * *